(12) United States Patent
Nguyen et al.

(10) Patent No.: US 11,578,701 B2
(45) Date of Patent: Feb. 14, 2023

(54) METHOD OF DETERMINING AN INDUCTION FACTOR BETWEEN A MEASUREMENT PLANE AND THE ROTOR PLANE OF A WIND TURBINE

(71) Applicant: IFP Energies nouvelles, Rueil-Malmaison (FR)

(72) Inventors: Hoai-Nam Nguyen, Rueil-Malmaison (FR); Fabrice Guillemin, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 17/495,802

(22) Filed: Oct. 6, 2021

(65) Prior Publication Data
US 2022/0112883 A1  Apr. 14, 2022

(30) Foreign Application Priority Data
Oct. 14, 2020  (FR) ..................... 2010493

(51) Int. Cl.
*F03D 17/00*  (2016.01)

(52) U.S. Cl.
CPC .......... *F03D 17/00* (2016.05); *F05B 2260/80* (2013.01); *F05B 2270/32* (2013.01); *F05B 2270/8042* (2013.01)

(58) Field of Classification Search
CPC ...... F03D 17/00; F03D 7/0204; F03D 7/0276; F05B 2260/80; F05B 2270/32; F05B 2270/8042; Y02E 10/72
See application file for complete search history.

(56) References Cited

U.S. PATENT DOCUMENTS

| | | | |
|---|---|---|---|
| 6,320,272 B1 * | 11/2001 | Lading | F03D 7/0224 290/55 |
| 11,105,929 B2 * | 8/2021 | Guillemin | G01S 17/58 |
| 2007/0075546 A1 * | 4/2007 | Avagliano | F03D 9/25 290/44 |
| 2007/0171396 A1 * | 7/2007 | Harris | G01S 7/493 356/28 |
| 2009/0047116 A1 * | 2/2009 | Barbu | F03D 7/024 415/10 |
| 2018/0017039 A1 * | 1/2018 | Davoust | F03D 7/0224 |
| 2020/0149512 A1 * | 5/2020 | Nguyen | G01P 5/26 |

FOREIGN PATENT DOCUMENTS

| | | | |
|---|---|---|---|
| EP | 2253838 A1 | 11/2010 | |
| EP | 3564524 A1 | 11/2019 | |
| EP | 3650687 A1 | 5/2020 | |
| EP | 3712621 A1 | 9/2020 | |

\* cited by examiner

*Primary Examiner* — David E Sosnowski
*Assistant Examiner* — Wayne A Lambert
(74) *Attorney, Agent, or Firm* — Fitch, Even, Tabin & Flannery LLP

(57) ABSTRACT

The present invention relates to a method of determining an induction factor between the rotor plane (PR) and a measurement plane (PM), involving measuring the wind speed in at least two measurement planes (PM), determining the wind speed in rotor plane (PR) by use of a Kalman filter from the measurements, and measuring the induction factor by use of an adaptive Kalman filter from the measurements and the wind speed in rotor plane (PR).

10 Claims, 3 Drawing Sheets

[Fig 1]
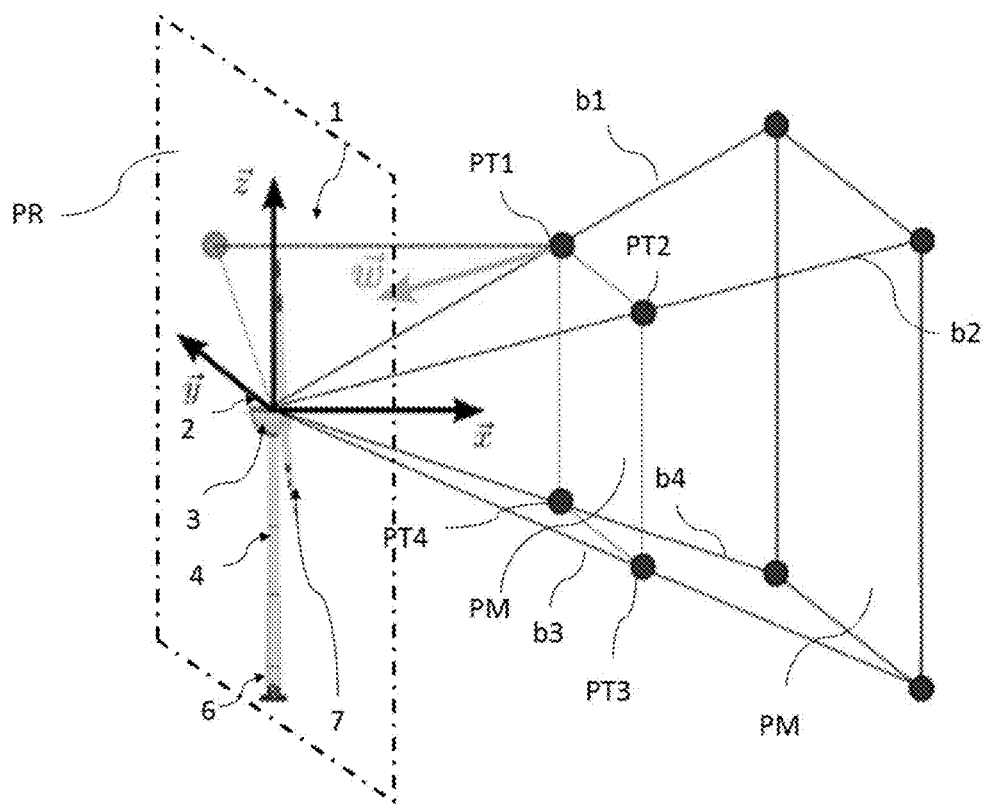
[Fig 2]
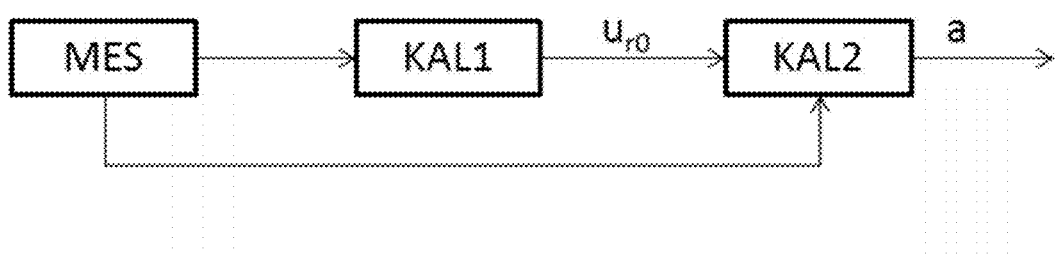
[Fig 3]
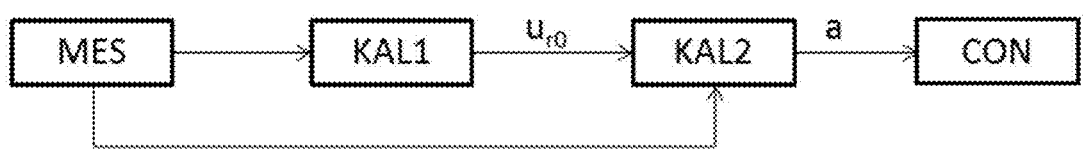

[Fig 4]
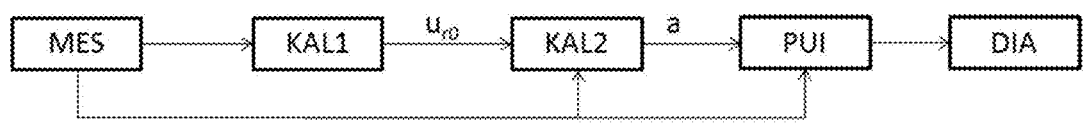
[Fig 5]
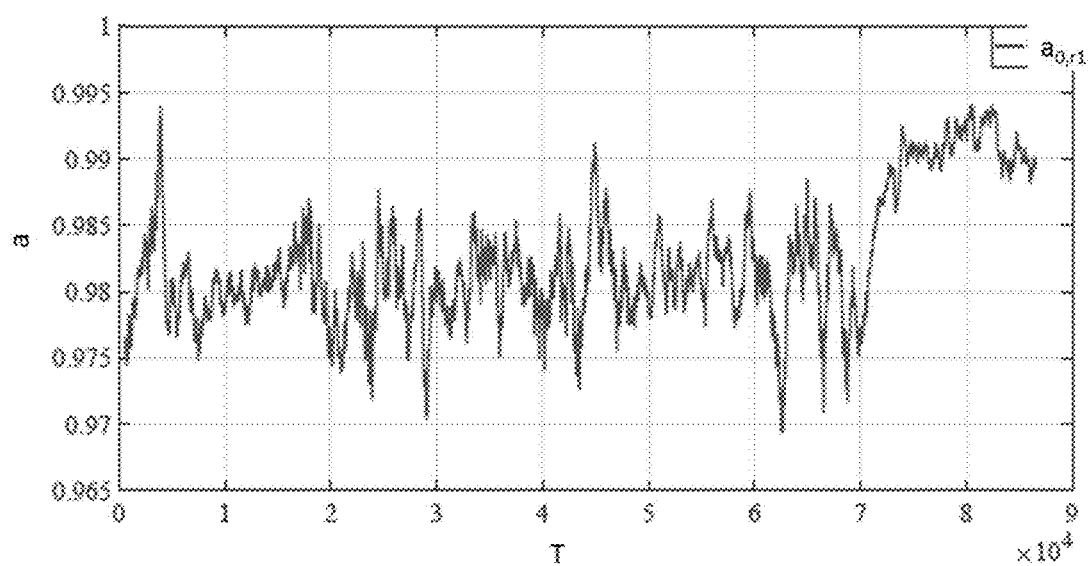

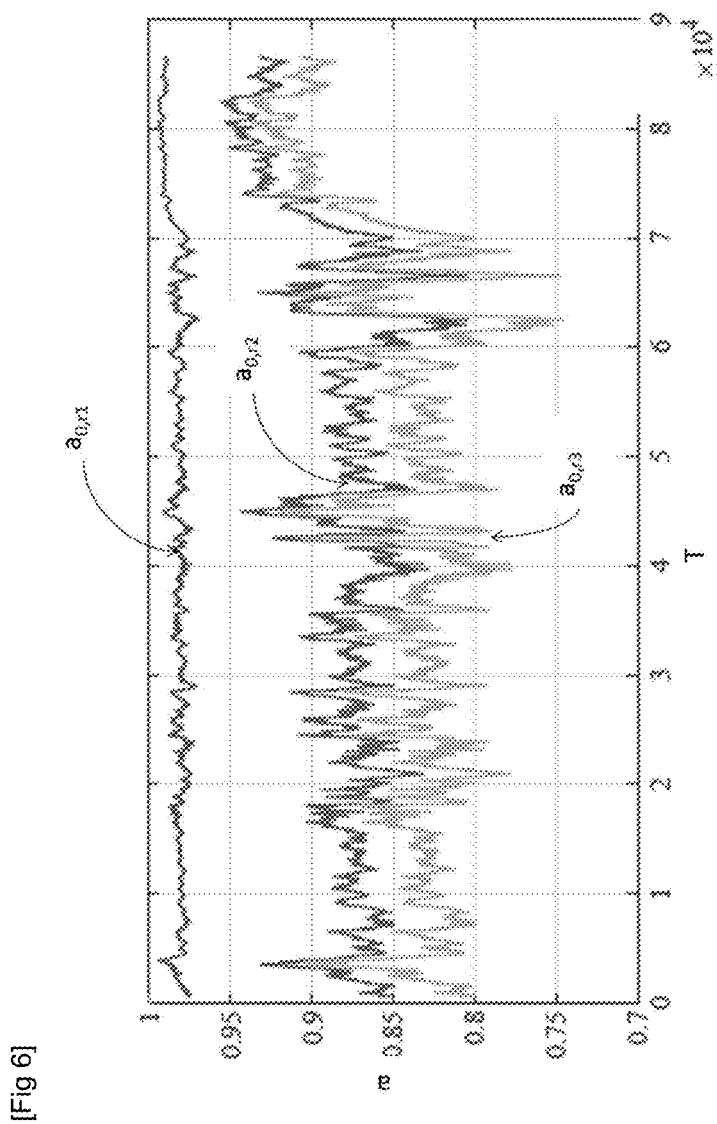
[Fig 6]

METHOD OF DETERMINING AN INDUCTION FACTOR BETWEEN A MEASUREMENT PLANE AND THE ROTOR PLANE OF A WIND TURBINE

CROSS-REFERENCE TO RELATED APPLICATION(S)

This application claims priority from French Application No. 20/10.493 filed Oct. 14, 2020 which is hereby incorporated herein by reference in its entirety.

BACKGROUND OF THE INVENTION

Field of the Invention

The present invention relates to the field of renewable energies and more particularly to the measurement of the wind, with turbine control (orientation, torque and speed regulation) at least one of diagnosis and monitoring objectives.

Description of the Prior Art

A wind turbine corrupts the kinetic energy from the wind into electrical or mechanical energy. For conversion of wind into electrical energy, the turbine has the following elements:
- a tower allowing a rotor to be positioned at a sufficient height to enable motion thereof (necessary for horizontal-axis wind turbines) or the rotor to be positioned at a height enabling it to be driven by a stronger and more regular wind than at ground level. The tower generally houses part of the electrical and electronic components (modulator, control, multiplier, generator, etc.);
- a nacelle mounted at the top of the tower which houses the mechanical, pneumatic and some of the electrical and electronic components necessary to operate the turbine. The nacelle can rotate to orient the machine in the correct direction;
- a rotor fastened to the nacelle, comprising blades (generally three) and the hub of the wind turbine. The rotor is driven by the wind energy and it is connected by a mechanical shaft, directly or indirectly (via a gearbox and mechanical shaft system), to an electrical machine (electrical generator) that converts the energy recovered into electrical energy. The rotor is potentially provided with control systems such as variable-angle blades or aerodynamic brakes; and
- a transmission having two shafts (mechanical shaft of the rotor and mechanical shaft of the electric machine) connected by a transmission (gearbox).

Since the beginning of the 1990s, there has been renewed interest in wind power, in particular in the European Union where the annual growth rate is about 20%. This growth is attributed to the inherent possibility for carbon-emission-free electricity generation. In order to sustain this growth, the energy yield of wind turbines still needs to be further improved. The prospect of wind power production increase requires developing effective production tools and advanced control tools in order to improve the performance of the machines. Wind turbines are designed to produce electricity at the lowest possible cost. They are therefore generally built so as to reach their maximum performance at a wind speed of approximately 15 m/s. It is not necessary to design wind turbines that maximize their yield at higher wind speeds, which are not common. In case of wind speeds above 15 m/s, it is necessary to lose part of the additional energy contained in the wind to avoid damage to the wind turbine. All wind turbines are therefore designed with a power regulation system.

For this power regulation, controllers have been designed for variable speed aerogenerators. The purpose of the controllers is to maximize the electric power recovered, to minimize the rotor speed fluctuations, and to minimize the fatigue and the extreme moments of the structure (blades, tower and platform).

Various techniques have been developed to know the wind speed of the rotor end.

According to a first technique, using an anemometer allows estimation of wind speed at one point, but this imprecise technology does not enable measurement of an entire wind field or to know the three-dimensional components of the wind speed.

According to a second technique, a LiDAR (Light Detection And Ranging) sensor can be used. LiDAR is a remote sensing or optical measurement technology based on the analysis of the properties of a beam returned to the emitter. This method is notably used for determining the distance to an object by a pulse laser. Unlike radars based on a similar principle, LiDAR sensors use visible or infrared light instead of radio waves. The distance to an object or a surface is given by the measurement of the delay between the pulse and the detection of the reflected signal.

In the field of wind turbines, LiDAR sensors are essential for proper functioning of large wind turbines, especially now that their size and power is increasing (today 5 MW, soon 12 MW for offshore turbines). This sensor enables remote wind measurements, first allowing wind turbines to be calibrated so that they can deliver maximum power (power curve optimization). For this calibration stage, the sensor can be positioned on the ground and vertically oriented (profiler), which allows measurement of the wind speed and direction, as well as the wind gradient depending on the altitude. This application is particularly critical because it allows knowing the energy generating resource. This is important for wind turbine projects since it conditions the financial reliability of the project.

A second application sets the sensor on the nacelle of the wind turbine in order to measure the wind field in front of the turbine while being nearly horizontally oriented. A priori, measuring the wind field in front of the turbine allows knowing in advance the turbulence that the wind turbine is going to encounter shortly thereafter. However, current wind turbine control and monitoring techniques do not allow a measurement performed by a LiDAR sensor by estimating precisely the wind speed at the rotor, that is in the rotor plane. Such an application is notably described in patent application FR-3-013,777 and corresponding US published patent application 2015145,253.

Furthermore, in the past decade, the behavior of the wind formed upstream from a wind turbine, the induction zone, has generated growing interest. In the induction zone, the wind is decelerating due to the presence and the operation of the wind turbine, which draws part of the aerodynamic power of the wind. Better understanding of the induction zone allows improving the control strategies based on a LiDAR sensor and the wind turbine power evaluations. In the first case, the objective is to use upstream wind measurements for predicting the wind speed in the rotor plane. In the latter case, it is making a connection between the power and the speed of the free flow, which is the wind speed that would have existed at a point corresponding to the position of the wind turbine in the absence of a wind turbine.

The interest of the induction zone therefore is in the use of measurements near the turbine to estimate the rotor effective wind speed.

In the publication of Emmanuel Simon, Pierre Branlard, and Alexander Raul Meyer Forsting entitled "Using A Cylindrical Vortex Model to Assess the Induction Zone in Front of Aligned and Yawed Rotors." In: EWEA Offshore 2015 Conference. European Wind Energy Association (EWEA). 2015, analytical formulas for the velocity field induced by a cylindrical vortex model are applied to assess the induction zone. The results are compared with actuator simulations for different operating conditions.

In the publication of D Medici, Stefan Ivanell, J-Å Dahlberg, and P Henrik Alfredsson entitled. "The Upstream Flow of a Wind Turbine: Blockage Effect." In: Wind Energy 14.5 (2011), pp. 691-697, wind tunnel measurements are used to study the induction zone of various wind turbines. Furthermore, the results are compared with an analytical expression for the induction zone obtained from a linear cylindrical vortex model.

In the document authored by Eric Simley, Nikolas Angelou, Torben Mikkelsen, Mikael Sjöholm, Jakob Mann, and Lucy Y Pao entitled "Characterization of Wind Velocities in the Upstream Induction Zone of a Wind Turbine Using Scanning Continuous Wave Lidars." In: Journal of Renewable and Sustainable Energy 8.1 (2016), p. 013301, the induction zone of a wind turbine is studied by synchronized continuous wave LiDAR sensors. It has been shown that the standard deviation of the longitudinal velocity component is relatively unchanged when the wind gets closer to the rotor, while the standard deviation of the vertical and lateral component slightly increases.

In the document authored by Niels Troldborg and Alexander Raul Meyer Forsting entitled "A Simple Model of the Wind Turbine Induction Zone Derived from Numerical Simulations." In: Wind Energy 20.12 (2017), pp. 2011-2020, the induction zone upstream from various wind turbines is studied by combining steady state Navier-Stokes simulations and an actuator disc approach. It has been shown that, for distances beyond one rotor radius upstream from the rotor, the induced velocity is similar and independent of the rotor geometry.

For all the approaches in the literature, it should be emphasized that the induction zone is calculated/estimated offline by simulations or experimental data. Furthermore, the induction zone is assumed to be implicitly constant for a given wind speed, once identified. Apparently, the induction zone provides a very average level of information on the wind speed deficit since it is clear that the induction zone is a function of the blade and yaw angles for a given wind speed. Therefore, these methods do not allow online and continuous determination of the physical phenomena involved in the induction zone.

Moreover, French patent application 3,088,434 which corresponds to US published application 2020/0,149,512) a method allowing determination an induction factor online by a LiDAR sensor arranged on a wind turbine as discussed. For this method, wind speed measurements are performed in measurement planes by the LiDAR sensor, then induction factors are determined between the measurement planes by use of the measurements and a first linear Kalman filter, and the induction factor between a measurement planes and the rotor plane of the wind turbine is deduced by use of a second linear Kalman filter. However, implementation of this method requires knowledge of the distance of the measurement planes from the wind turbine rotor plane. Now, the distances of the measurement planes can be imposed by the LiDAR user which may be different from one LiDAR sensor to the other and they may be unknown. Therefore, for such situations, the method described in this patent application is not suitable.

SUMMARY OF THE INVENTION

The invention determines in real time the induction factor between a measurement plane and the rotor plane. In any situation, for any measurement distance, measurements are performed by a LiDAR preferably positioned on a wind turbine nacelle, and preferably oriented to be in line with the direction of the rotor axis, while being robust against yaw, pitch and roll misalignments with respect to this direction. The present invention relates to a method of determining an induction factor between the rotor plane and a measurement plane, involving measuring the wind speed in at least two measurement planes, determining the wind speed in the rotor plane by use of a Kalman filter from the measurements, and measuring the induction factor by use of an adaptive Kalman filter from the measurements and the wind speed in the rotor plane. The two Kalman filters provide continuous determination of the induction factor. The approach imposes no fixed measurement distance, thus allowing unconstrained LiDAR parametrization for selecting the measurement distances.

The present invention relates to a method of determining an induction factor between a measurement plane and the rotor plane of a wind turbine whenever the wind turbine is equipped with a LiDAR sensor which performs a measurement relative to the wind speed in at least two measurement planes distant from the wind turbine, the induction factor of the wind represents a wind deceleration coefficient between two distant points upstream from the wind turbine, a deceleration results from the operation of the wind turbine in the wind field. The method comprises:

a) measuring the wind speed in at least two measurement planes spaced from the wind turbine by use of the LiDAR sensor, b) determining the wind speed in the rotor plane by use of the measurements of the wind speed in at least two measurement planes and a Kalman filter; and c) determining the induction factor of the wind between a measurement plane and the rotor plane by use of the wind speed determined in the rotor plane, with the wind speed measurement being considered in the measurement plane and an adaptive Kalman filter.

According to one embodiment, the wind speed in the rotor plane is determined by use of a Kalman filter applied to a parametric function relating the wind speed to the measurement plane distance.

Advantageously, the parametric function is a polynomial function, preferably a polynomial function of degree 2, or a piecewise affine function.

According to one implementation, the state model used in the Kalman filter is written:

$$\begin{cases} x(k) = x(k-1) + \mu(k) \\ y(k) = Hx(k) + \epsilon(k) \end{cases},$$

with k being the discrete time, x being the vector comprising the coefficients of the parametric function, y being the wind speed vector in the at least two measurement planes, H being a matrix depending on the distances of the at least two measurement planes and defined according to the parametric function, µ being the variation of the coefficients of the parametric function and ε being a measurement noise vector.

Advantageously, the parametric function is a polynomial function that is written: $f(r_i)=c_2 r_i^2+c_1 r_i+c_0$, with $r_i$ being the distance of measurement plane i, f being the parametric function, $c_0$, $c_1$, $c_2$ being the coefficients of the parametric function, and wherein matrix H is written:

$$H = \begin{bmatrix} r_1^2 & r_1 & 1 \\ \ldots & \ldots & \ldots \\ r_n^2 & r_n & 1 \end{bmatrix},$$

with n being the number of measurement planes for which measurements have been performed.

According to one aspect, the induction factor is determined by applying the adaptive Kalman filter to the following state model:

$$\begin{cases} a_{r_i,r_j}(k) = a_{r_i,r_j}(k-1) + \xi(k-1) \\ u_{r_i}(k) = u_{r_j}(k) a_{r_i,r_j}(k) + v(k) \end{cases},$$

with $$v(k) = -\epsilon_{r_i}(k) + \epsilon_{r_j}(k) a_{r_i,r_j}(k),$$

and k being the discrete time, $r_i$ being the distance of measurement plane i, $r_j$ being the distance of measurement plane j, $a_{r_i,r_j}$ being the induction factor between measurement plane i and measurement plane j, $u_{r_i}$ being the wind speed in plane i, $u_{r_j}$ being the wind speed in plane j, ξ being the induction factor variation over time, $\epsilon_{r_i}$ being the noise of the wind speed in the measurement plane i $u_{r_i}$, and $\epsilon_{r_j}$ being the noise of the wind speed in the measurement plane j $u_{r_j}$.

Moreover, the invention relates to a method of controlling a wind turbine equipped with a LiDAR sensor. The following steps are carried out for this method:

a) determining the induction factor between a measurement plane and the rotor plane of a wind turbine by use of the method according to one of the above features; and b) controlling the wind turbine as a function of the induction factor between the measurement plane being considered and the rotor plane of the wind turbine.

The invention further relates to a method for at least one of diagnosis and monitoring of a wind turbine equipped with a LiDAR sensor. The following steps are carried out for this method:

a) determining an induction factor of the wind between a measurement plane and the rotor plane of a wind turbine by use of the method according to one of the above features;

b) determining the aerodynamic power drawn from the wind by the wind turbine by use of the induction factor of the wind determined between a measurement plane and the rotor plane of a wind turbine; and c) diagnosing at least one of and monitoring the operation of the wind turbine by use of the determined aerodynamic power being drawn.

Furthermore, the invention relates to a computer program product comprising code instructions designed to carry out the steps of a method according to one of the above features, when the program being executed on a processor for processing the LiDAR sensor.

Furthermore, the invention relates to a LiDAR sensor for a wind turbine comprising a processor for implementing a method according to one of the above features.

Moreover, the invention relates to a wind turbine comprising a LiDAR sensor according to one of the above features, the LiDAR sensor being preferably positioned on the nacelle of the wind turbine or in the hub of the wind turbine.

BRIEF DESCRIPTION OF THE DRAWINGS

Other features and advantages of the methods and the systems according to the invention will be clear from reading the description hereafter of embodiments given by way of non-limitative example, with reference to the accompanying figures wherein:

FIG. 1 illustrates a wind turbine equipped with a LiDAR sensor according to an embodiment of the invention;

FIG. 2 illustrates the steps of the method for determining an induction factor of the wind according to an embodiment of the invention;

FIG. 3 illustrates the steps of the wind turbine control method according to an embodiment of the invention;

FIG. 4 illustrates the steps of the wind turbine diagnosis method according to an embodiment of the invention;

FIG. 5 is a curve of the induction factor as a function of time for an example embodiment for a first measurement plane; and FIG. 6 is a curve of the induction factor as a function of time for an example embodiment for three measurement planes.

DETAILED DESCRIPTION OF THE INVENTION

The invention relates to a method for measuring the resource of wind turbines which is the wind, in particular with at least one of turbine control (orientation, torque and speed regulation), diagnosis, and monitoring objectives, wherein the wind turbine is at least one of controlled and monitored according to a determination of an induction factor of the wind with the turbine being equipped with a LiDAR sensor to perform this estimation.

The induction factor is a wind deceleration coefficient in the induction zone of the wind turbine. The wind is decelerated in the upstream zone of the turbine due to the presence of the wind turbine and to the operation thereof. In other words, the power drawn by the turbine from the wind causes deceleration of the wind upstream from the turbine. Thus, the induction factor is representative of a physical phenomenon and it gives an indication relative to the resource of the wind turbine. The induction factor is calculated between two planes upstream from the wind turbine, by definition, it corresponds to the speed ratio between these planes. If a denotes the induction factor, u is the wind speed, and d1 and d2 are the respective distances of the two planes considered relative to the rotor plane, the induction factor between the planes located at distances d1 and d2 from the rotor plane can be written as:

$$a_{d1,d2} = \frac{u_{d1}}{u_{d2}}$$

When one of the planes being considered is the rotor plane, d1 is 0, and the induction factor is the induction factor between a measurement plane and the rotor plane. When neither of the two planes is the rotor plane, then the induction factor is the induction factor between measurement planes. In the rest of the application hereafter, the rotor plane is considered to be a measurement plane for which the distance is zero.

It can be noted that, in the literature, the induction factor may be defined by:

$$1 - a_{d1,d2} = \frac{u_{d1}}{u_{d2}}$$

The method according to the invention is also suited to the definition of this induction factor, and the second definition of the induction factor can be deduced by a simple subtraction with respect to the first definition.

According to the invention, the LiDAR sensor allows measuring the wind speed in at least two measurement planes upstream from the wind turbine. There are several types of LiDAR sensors, for example scanning LiDAR, continuous wave LiDAR or pulsed LiDAR sensors. Within the context of the invention, a pulsed LiDAR is preferably used. However, the other LiDAR technologies may also be used while remaining within the scope of the invention.

LiDAR sensors allow fast measurement. Therefore, using such a sensor enables fast and continuous determination of the induction factor of the wind. For example, the sampling rate of the LiDAR sensor can range between 1 and 5 Hz, or even more in the future.

FIG. 1 schematically shows, by way of non-limitative example, a horizontal-axis wind turbine 1 equipped with a LiDAR sensor 2 for performing the method according to one embodiment of the invention. LiDAR sensor 2 is used to measure the wind speed at a given distance in plural measurement planes PM (only two measurement planes are shown). Knowing the wind measurement in advance a priori allows providing substantial information. This figure also shows axes x, y and z. The reference point of this coordinate system is the center of the rotor. Direction x is the longitudinal direction corresponding to the direction of the rotor axis, upstream from the wind turbine. This direction also corresponds to the measurement direction of LiDAR sensor 2. Direction y which is perpendicular to direction x, is the lateral direction located in a horizontal plane (directions x, y form a horizontal plane). Direction z is the vertical direction (substantially corresponding to the direction of tower 4) pointing up, axis z is perpendicular to axes x and y. The rotor plane is indicated by the rectangle in dotted line PR, which is defined by directions y, z for a zero value of x. Measurement planes PM are formed by directions y, z at a distance from rotor plane PR (for a non-zero value of x). Measurement planes PM are parallel to rotor plane PR.

Conventionally, a wind turbine 1 converts the kinetic energy of the wind into electrical or mechanical energy. To convert wind energy to electrical energy, it is made up of the following elements:

a tower 4 which allows a rotor (not shown) to be positioned at a sufficient height to enable motion thereof (necessary for horizontal-axis wind turbines) or this rotor to be positioned at a height enabling it to be driven by a stronger and more regular wind than at ground level 6. Tower 4 generally houses part of the electrical and electronic components (modulator, control, multiplier, generator, etc.);

a nacelle 3, which is mounted at the top of tower 4, housing mechanical, pneumatic and some electrical and electronic components (not shown) necessary for operating the machine. Nacelle 3 can rotate to orient the machine in the right direction;

the rotor which is fastened to the nacelle, comprising blades 7 (generally three) and the hub of the wind turbine. The rotor is driven by the energy from the wind and is connected by a mechanical shaft, directly or indirectly (via a gearbox and mechanical shaft system), to an electrical machine (electric generator) (not shown) that converts the energy recovered to electrical energy. The rotor is potentially provided with control systems such as variable-angle blades or aerodynamic brakes;

a transmission made up of two shafts (mechanical shaft of the rotor and mechanical shaft of the electrical machine) connected by a transmission (gearbox) (not shown).

As can be seen in FIG. 1, which is an example embodiment of a pulsed LiDAR sensor, the LiDAR sensor 2 comprises four beams or measurement axes (b1, b2, b3, b4). By way of non-limitative example, the method according to the invention also operates with a LiDAR sensor comprising any number of beams. The LiDAR sensor performs a punctual measurement at each intersection point of a measurement plane PM and a beam (b1, b2, b3, b4). These measurement points are represented by black circles in FIG. 1 and are denoted by PT1, PT2, PT3, PT4. Processing the measurements at these measurement points allows determining the wind speed in measurement planes PM. The wind modelling method described in French patent application 3,068,139, which corresponds to US patent application 2020/0,124,026, can therefore notably be applied.

Preferably, LiDAR sensor 2 can be mounted on nacelle 3 of wind turbine 1, or in the hub of the wind turbine (upstream end of the rotor).

According to the invention, the method for determining an induction factor of the wind between the measurement plane and the rotor plane of a wind turbine comprises steps of:

1) measuring the wind speed in measurement planes;
2) determining the wind speed in the rotor plane; and
3) determining the induction factor between a measurement plane and the rotor plane.

These steps are carried out in real time and are described in detail in the rest of the description below.

FIG. 2 schematically illustrates, by way of non-limitative example, the steps of the method according to one embodiment of the invention. The first step is a step (MES) which measures the wind speed in several measurement planes. The second step uses the measurements and a Kalman filter (KAL1) to determine the wind speed in the rotor plane denoted by $u_{r0}$. The third step uses the wind speed in rotor plane $u_{r0}$ and the measurements for determining, by use of an adaptive Kalman filter (KAL2), the induction factor of the wind between a measurement plane and the rotor plane. The induction factor is denoted by a.

In the rest of the description, what is referred to as the distance of the measurement plane is the distance between the measurement plane and the rotor plane. It is therefore a longitudinal distance (along axis x in FIG. 1).

1. Wind Speed Measurement

In this step, the wind speed is continuously measured in at least two measurement planes distant from the wind turbine, by the LiDAR sensor. Thus, the wind speed can be known upstream from the wind turbine in at least two measurement planes located at different distances from the wind turbine so that the wind speed is known at least at two distances from the rotor plane of the wind turbine. For this step, the three wind components are considered (longitudinal, lateral and vertical), as well as the wind speed variations in the measurement plane (the wind speed increases with height for example). Since the method according to the invention does not require knowledge of the distance between the measurement planes and the rotor plane, these distances may not be imposed for implementing the method according to the invention.

According to one embodiment of the invention, the wind speed is measured in at least three measurement planes to improve the wind knowledge precision upstream from the wind turbine and, therefore, the precision in estimation of the induction factor of the wind in the rotor plane.

According to one implementation of the invention, the measurement planes can be spaced out for example by a longitudinal distance (along axis x in FIG. 6) ranging between 50 and 400 m from the rotor plane. It is thus possible to determine the evolution of the wind speed over a long distance upstream from the wind turbine, which also allows increased precision in estimation of the induction factors of the wind.

2. Determining the Wind Speed in the Rotor Plane

This step determines the wind speed in the rotor plane by use of the wind speed measurements in at least two measurement planes obtained in step 1 and using a Kalman filter. Application of the Kalman filter permits a state observer to be obtained.

According to one embodiment of the invention, this step can be carried out using a Kalman filter applied to a parametric function that relates the wind speed to the distance of the measurement plane. In other words, the parametric function is a function whose variable is the distance of the measurement plane and that determines the wind speed for this measurement plane. This function is referred to as "parametric" because it depends on at least one coefficient that is determined by the Kalman filter in this step. The at least one coefficient is variable over time. Once the Kalman filter has determined, the at least one coefficient of the parametric function which is applied for the rotor plane, for a zero distance to determine the wind speed in the rotor plane.

According to one implementation of this embodiment, the parametric function can be of any type, for example a polynomial function, preferably a polynomial function of degree 2, a piecewise affine function, etc.

According to an implementation of this embodiment, the state model used in the Kalman filter for this step can be written as follows:

$$\begin{cases} x(k) = x(k-1) + \mu(k) \\ y(k) = Hx(k) + \epsilon(k) \end{cases},$$

with k being the discrete time, x being the vector comprising the coefficients of the parametric function, y being the wind speed vector in the at least two measurement planes, H being a matrix depending on the distances of the at least two measurement planes and defined according to the parametric function, $\mu$ being the variation of the coefficients of the parametric function and $\epsilon$ being a measurement noise vector.

For the example embodiment where the parametric function is a polynomial function of degree 2, this parametric function f can be written:

$$f(r_i) = c_2 r_i^2 + c_1 r_i + c_0,$$

with $r_i$ being the distance of measurement plane i (with $r_i = r_0 = 0$ if the rotor plane is considered), $c_0$, $c_1$, $c_2$ being the coefficients of the parametric function. In this case, matrix H can be written:

$$H = \begin{bmatrix} r_1^2 & r_1 & 1 \\ \dots & \dots & \dots \\ r_n^2 & r_n & 1 \end{bmatrix},$$

with n being the number of measurement planes for which measurements have been performed.

In this case, it can be written:

$$u_{ri}(k) = \begin{bmatrix} r_i^2 & r_i & 1 \end{bmatrix} \begin{bmatrix} c_2(k) \\ c_1(k) \\ c_0(k) \end{bmatrix},$$

with $u_{ri}$ being the wind speed in measurement plane i.

Considering that the wind speed in the measurement plane comprises noises $\epsilon_{ri}(k)$, a model can be written:

$$u_{ri}(k) = \begin{bmatrix} r_i^2 & r_i & 1 \end{bmatrix} \begin{bmatrix} c_2(k) \\ c_1(k) \\ c_0(k) \end{bmatrix} + \epsilon_{ri}(k)$$

Assuming that the variations of the parametric function coefficients are small, we can write:

$$\begin{bmatrix} c_2(k) \\ c_1(k) \\ c_0(k) \end{bmatrix} = \begin{bmatrix} c_2(k-1) \\ c_1(k-1) \\ c_0(k-1) \end{bmatrix} + \mu(k),$$

with $\mu$ being the variation of the coefficients.

By defining:

$$x(k) = \begin{bmatrix} c_2(k) \\ c_1(k) \\ c_0(k) \end{bmatrix}$$

$$H = \begin{bmatrix} r_1^2 & r_1 & 1 \\ \dots & \dots & \dots \\ r_n^2 & r_n & 1 \end{bmatrix}$$

and $$y(k) = [u_1(k) u_2(k) \dots u_{10}(k)]^T$$

$$\epsilon(k) = [\epsilon_1(k) \epsilon_2(k) \dots \epsilon_{10}(k)]^T$$

the state model illustrated above is obtained:

$$\begin{cases} x(k) = x(k-1) + \mu(k) \\ y(k) = Hx(k) + \epsilon(k) \end{cases}$$

The determination of state vector x for this example by use of a Kalman filter is described hereafter. Such a filter provides the solution to the following problem:

$$\min_{x(k)} J(k)$$

-continued with $$J(k) = x(0) - \bar{x}(0))^T P_0^{-1}(x(0) - \bar{x}(0)) + \sum_{i=1}^{K} (\eta(j-1)^T Q^{-1} \eta(k-1) + \mu(j)^T R^{-1} \mu(j))$$

$P_0$, Q, R are weighting matrices of suitable dimensions, $\bar{x}(0)$ is the average value of the initial state $x(0)$. It is reminded that:

$$\eta(k-1)=x(k)-x(k-1)$$

and $$\mu(k)=y(k)-Hx(k)$$

The following assumptions can then be made, which mainly concern a mathematical interpretation for $P_0$, Q and R:
- $x(0)$ is a random vector not correlated with noises $\eta(k)$ and $\mu(k)$,
- $x(0)$ has a known mean $\bar{x}(0)$ with $P_0$ being the covariance matrix defined by:

$$P_0 = E[(x(0)-\bar{x}(0))(x(0)-\bar{x}(0))^T]$$

$\eta(k)$ and $\mu(k)$ are white noises with zero means and are not correlated with covariance matrices Q and R, respectively:

$$E[\eta(k)\eta(j)^T] = \begin{cases} Q \text{ if } k=j \\ 0 \text{ if } k \neq j \end{cases}$$

$$E[\mu(k)\mu(j)^T] = \begin{cases} R \text{ if } k=j \\ 0 \text{ if } k \neq j \end{cases}$$

$E[\eta(k)\mu(j)^T]=0$ for all k, j.

The following notations are also adopted:
- $\hat{x}(k|k-1)$ is the estimation of vector $x(k)$ given the measurements performed until time $k-1$.
- $\hat{x}(k|k)$ is the estimation of vector $x(k)$ given the measurements performed until time $k$.
- $P(k|k-1)$ is the covariance matrix of vector $x(k)$ given the measurements performed until time $k-1$.
- $P(k|k)$ is the covariance matrix of vector $x(k)$ given the measurements performed until time $k$.

The Kalman filtering algorithm can then be summarized by the two systems of equations as follows:

time update equations:

$$\begin{cases} \hat{x}(k|k-1) = \hat{x}(k-1|k-1) \\ P(k|k-1) = P(k-1|k-1) + Q \end{cases}$$

measurement update equations:

$$\begin{cases} K(k) = P(k|k-1)H^T(P(k|k-1) + HRH^T)^{-1} \\ \hat{x}(k|k) = \hat{x}(k|k-1) + K(k)(y(k) - H\hat{x}(k|k-1)) \\ P(k|k) = (I - K(k))P(k|k-1) \end{cases}$$

Thus, by carrying out these steps, the estimation $\hat{x}(k|k)$ of vector x can be determined, which implies that the coefficients of the parametric function can be determined. It is thus possible to determine the wind speed in the rotor plane $u_{r0}$ by applying the formula: $u_{r0}=[0\ 0\ 1]\hat{x}(k|k)$ This formula corresponds to the embodiment of the polynomial parametric function of degree 2 for the value $r_i=0$, and this formula needs to be adapted depending on the parametric function being used.

3. Determining the Induction Factor Between a Measurement Plane and the Rotor Plane This step determines in real time the induction factor of the wind between one of the measurement planes for which the wind speed has been measured and the rotor plane. Thus, the evolution of the wind at the rotor can be represented by accounting for the physical phenomena, in particular the wind deceleration. According to the invention, the induction factor of the wind between a measurement plane and the rotor plane is determined by use of the wind speed in the rotor plane obtained in step 2, the wind speed measurements in at least two measurement planes obtained in step 1 and a Kalman filter which is notably an adaptive Kalman filter. Application of the Kalman filter provides a state observer. The adaptive Kalman filter provides adaptation of the covariance matrix of the noise according to the wind speed. Thus, the filter is efficient over a wide wind speed range. Besides, the adaptive Kalman filter is robust against wind speed variations.

Given that the wind speed is known in at least two measurement planes and in the rotor plane, the equation defining the induction factor could be directly used to determine it: $a_{d1,d2}=u_{d1}/u_{d2}$. However, this method has two drawbacks in that it provides no information on the estimation quality, while the wind speeds are estimated with their confidence intervals, and for low wind speeds, a numerical stability problem may occur.

According to one embodiment of the invention, the induction factor of the wind can be determined by applying the adaptive Kalman filter to the following state model:

$$\begin{cases} a_{r_i,r_j}(k) = a_{r_i,r_j}(k-1) + \xi(k-1) \\ u_{r_i}(k) = u_{r_j}(k)a_{r_i,r_j}(k) + v(k) \end{cases}$$

with $v(k)=-\epsilon_{r_i}(k)+\epsilon_{r_j}(k)a_{r_i,r_j}(k)$ and k is the discrete time, $r_i$ is the distance from measurement plane i to the rotor plane (with $r_i=r_0=0$ when considering the rotor plane), $r_j$ is the distance from measurement plane j to the rotor plane (with $r_j=r_0=0$ if the rotor plane is considered), $a_{r_i,r_j}$ is the induction factor between measurement plane i and measurement plane j (if i=0 or j=0, then the rotor plane is considered), $u_{r_i}$ is the wind speed in measurement plane i (with $r_i=r_0=0$ if when considering the rotor plane), $u_{r_j}$ is the wind speed in measurement plane j (with $r_j=r_0=0$ i when the rotor plane is considered), $\xi$ is the induction factor variation over time, $\epsilon_{r_i}$ being the noise of the wind speed in the measurement plane i $u_{r_i}$, $\epsilon_{r_j}$ is the noise of the wind speed in the measurement plane j $u_{r_j}$.

Indeed, the adaptive Kalman filter can be used by the various steps described below.

The induction factor equation can be written:

$$u_{r_j}(k)a_{r_i,r_j}(k)=u_{r_i}(k).$$

Given that the wind speeds contain noise, a more realistic model can be written:

$(u_{r_j}(k)+\epsilon_{r_j}(k))a_{r_i,r_j}(k)=u_{r_i}(k)+\epsilon_{r_i}(k)$, with $\epsilon_{r_i}$ being the noise of the wind speed in measurement plane i $u_{r_i}$ and $\epsilon_{r_j}$ being the noise of the wind speed in the measurement plane j $u_{r_j}$.

It is then defined:

$$v(k)=-\epsilon_{r_i}(k)+\epsilon_{r_j}(k)a_{r_i,r_j}(k).$$

providing the equation:

$$u_i(k)=u_{r_j}(k)a_{r_i,r_j}(k)+v(k).$$

It is assumed that noises $\epsilon_{ri}$ and $\epsilon_{rj}$ are not correlated (in other words, the equation can be written: $E[\epsilon_{r_i}(k)\epsilon_{r_j}(k)]=0$). In this case, the variance of v(k) can be:

It is noted that $R_v(k)$ depends on time with k being the discrete time.

Assuming that the variation over time of the induction factor is small, it can be written:

$a_{r_i,r_j}(k)=a_{r_i,r_j}(k-1)+\xi(k-1)$, with being the induction factor variation over time.

Using these equations, the state model above is expressed as:

$$\begin{cases} a_{r_i,r_j}(k) = a_{r_i,r_j}(k-1) + \xi(k-1) \\ u_{r_i}(k) = u_{r_j}(k)a_{r_i,r_j}(k) + v(k) \end{cases}$$

An adaptive Kalman filter is then used because the covariance matrix of the measurement noise $R_v(k)$ is a function of time. With this adaptive Kalman filter, a determination $\widehat{a_{r_i,r_j}}$ (k|k), can be expressed as the estimation of the induction factor between measurement planes i and j. Given the wind speeds in measurement planes i and j at time k, then it may be considered that $r_i$=0 for the rotor plane, and j corresponds to the measurement plane considered among the measurement planes used for the measurements in step 1.

Applications

The present invention also relates to a method of controlling a wind turbine equipped with a LiDAR sensor. The following steps are carried out for this method:
- determining an induction factor of the wind between a measurement plane and the rotor plane of the wind turbine by the method of determining the induction factor according to any one of the above variant combinations,
- controlling the wind turbine according to the induction factor of the wind between the measurement plane being considered and the rotor plane.

Precise real-time knowledge of the induction factor of the wind allows suitable wind turbine control in terms of minimization for the effects on the wind turbine structure and maximization of the recovered power. Indeed, of this control, the LiDAR sensor reduces the loads on the structure, the blades and the tower representing 54% of the cost thereof. Therefore, using a LiDAR sensor allows optimizing the wind turbine structure and decreasing the costs and maintenance.

According to an implementation of the invention, at least one of the inclination angle of the blades and the electrical recovery torque of the wind turbine generator can be controlled depending on the wind speed. Other types of regulation devices can also be used.

According to an embodiment of the invention, at least one of the inclination angle of the blades and the electrical recovery torque can be determined by use of wind turbine maps as a function of the wind speed at the rotor. For example, the control method described in French patent application 2,976,630 A1 which corresponds to US published patent application 2012/032,1463 can be applied.

FIG. 3 schematically illustrates, by way of non-limitative example, the steps of the method according to an embodiment of the invention. The first step is a step (MES) of measuring the wind speed in measurement planes. The second step uses the measurements and a Kalman filter (KAL1) to determine the wind speed in the rotor plane denoted by $u_{r0}$. The third step uses the wind speed in the rotor plane $u_{r0}$ and the measurements to determine, by use of an adaptive Kalman filter (KAL2), the induction factor of the wind between a measurement plane and the rotor plane with this induction factor being denoted by a. The fourth step (CON) relates to the wind turbine control according to the induction factor of the wind a.

Furthermore, the invention relates to at least one of a diagnosis and monitoring method for a wind turbine equipped with a LiDAR sensor, wherein the following steps are carried out:
- determining an induction factor of the wind between a measurement plane and the rotor plane of the wind turbine by use of the induction factor determination method according to any one of the variant combinations described above,
- determining the aerodynamic power drawn from the wind by the wind turbine by use of the induction factor determined in the previous step; and
- at least one of diagnosing and monitoring the operation of the wind turbine according to the aerodynamic power determined in the previous step.

The induction factor expressing the wind deceleration due to the presence of the wind turbine in the wind field makes possible determining from the induction factor the aerodynamic power drawn from the wind by the wind turbine. According to an embodiment, this drawn aerodynamic power $P_{aéro}$ can be determined by use of induction factor a, the speed of the free wind flow $V_{inf}$, the air density Ro and the surface area of the wind turbine $A_d$, $$P_{aéro}=2RoA_dV_{inf}^3a(1-a)^2$$

The drawn aerodynamic power provides information on the operation of the wind turbine, which enables at least one of diagnosis and monitoring of the wind turbine operation. The basic method is to compare the electrical power produced by the wind turbine with the theoretical electrical power given by the previous equation, by approximating the transmission efficiency and the electrical conversion efficiency of the generator to 1.

The ratio of the two powers allows performing at least one of diagnosis and monitoring of the operation and of the effective aerodynamic efficiency of the wind turbine.

Real-time update of the induction factor also allows quantification of the aerodynamic thrust loads applied on the wind turbine and deducing therefrom an estimation of the cumulative fatigue damage. According to an implementation of the invention, this can be done using the relation that connects the thrust coefficient $C_T$ to the induction factor (Burton, Wind Energy Handbook, ch.3.2), which can be written as follows: $C_T$=4a(1−a).

Furthermore, online estimation of the induction factor allows developing and updating in real time simplified wind turbine wake models. This allows working out operation diagnoses at wind farm scale and identifying risk zones with wake interaction between neighboring wind turbines, or even diagnosis and control of wind farms.

In this case, the invention may relate to at least one of a diagnosis and monitoring method for a wind farm, wherein the following steps are carried out:
- determining an induction factor of the wind between a measurement plane and the rotor plane of the wind turbine by use of the induction factor determination method according to any one of the variant combinations described above, for at least one wind turbine of a wind farm;

determining a thrust coefficient for at least one wind turbine by use of the determining induction factor;

constructing a wake model for at least one wind turbine using the thrust coefficient thus determined; and at least one of diagnosing and monitoring the operation of at least one wind turbine of the wind farm according to the wake model determined in the previous step.

According to an embodiment, the wake model can take the form of Jensen's model as described in the document: "Wake effect modeling: A Review of Wind Farm Layout Optimization Using Jensen's Model", Rabia Shakoor, Mohammad Yusri Hassan, Abdur Raheem, Yuan-Kang Wu, Renewable and Sustainable Energy Reviews, Volume 58, May 2016, Pages 1048-1059.

The wake model provides wake information on the operation of the wind farm, which enables at least one of diagnosis and monitoring of the wind turbine operation. The basic method is to compare the electrical power produced by the wind farm with the theoretical electrical power.

Precise real-time knowledge of the wake allows suitable wind farm control in terms of maximization of the wind energy recovery by the wind farm.

FIG. 4 schematically illustrates, by way of non-limitative example, the steps of the method according to an embodiment of the invention. The first step is a step (MES) of measuring the wind speed in several measurement planes. The second step uses the measurements and a Kalman filter (KAL1) to determine the wind speed in the rotor plane denoted by $u_{r0}$. The third step uses the wind speed in the rotor plane $u_{r0}$ and the measurements to determine, by use of an adaptive Kalman filter (KAL2), the induction factor of the wind between a measurement plane and the rotor plane, with the induction factor being denoted by a. The fourth step (PUI) determines the aerodynamic power drawn from the wind $P_{aero}$ from the induction factor a between a measurement plane and the rotor plane, and a wind speed measurement in the measurement plane. The fifth step (DIA) performs diagnosis or monitoring of the wind turbine according to the drawn aerodynamic power $P_{aéro}$.

Furthermore, the invention relates to a computer program product comprising code instructions, designed to carry out the steps of one of the methods described above which are an induction factor determination method, control method, at least one of a diagnosis and monitoring method. The program is executed on a processor of the LiDAR sensor, or on any similar medium connected to the LiDAR sensor or to the wind turbine.

According to an aspect, the present invention also relates to a LiDAR sensor for a wind turbine, comprising a processor configured to implement one of the methods described above which are an induction factor determination method, control method, and at least one of diagnosis and monitoring method.

According to an implementation of the invention, the LiDAR sensor can be a scanning LiDAR, a continuous wave LiDAR or a pulsed LiDAR sensor. Preferably, the LiDAR sensor is a pulsed LiDAR sensor.

The invention also relates to a wind turbine, notably an offshore or an onshore wind turbine equipped with a LiDAR sensor as described above. According to an embodiment of the invention, the LiDAR sensor can be arranged on the nacelle of the wind turbine or in the hub of the wind turbine (that is at the end of the wind turbine rotor). The LiDAR sensor is so oriented as to perform a measurement of the wind upstream from the wind turbine (i.e. before the wind turbine and along the longitudinal axis thereof, designated by axis x in FIG. 1). According to an embodiment, the wind turbine can be similar to the wind turbine illustrated in FIG. 1.

For the embodiment of the control method, the wind turbine can a comprise a control, for example for control of the pitch angle of a wind turbine blade or of the electrical torque, for implementing the method according to the invention.

For the embodiment of at least one of the diagnosis and monitoring method, the wind turbine can comprise at least one of wind turbine operation diagnosis and monitoring.

Application Example

Other features and advantages of the method according to the invention will be clear from reading the description of the example hereafter.

In this example, experimental measurements of a LiDAR sensor are used and the induction factor of the wind between a measurement plane and the rotor plane according to an embodiment of the invention. The embodiment of the invention implemented in this example is a polynomial parametric function of degree 2. Moreover, for this example, the LiDAR sensor measures the wind speed in ten measurement planes, at respective distances r1, r2, . . . , r10 from the rotor plane.

By use of the method according to an embodiment of the invention, the induction factor is determined:

between the measurement plane at distance r1 and the rotor plane;

between the measurement plane at distance r2 and the rotor plane with distance r2 being greater than distance r1; and between the measurement plane at distance r3 and the rotor plane, distance r3 being greater than distance r2.

FIG. 5 is a curve of induction factor a as a function of time T. FIG. 5 illustrates only the induction factor between the measurement plane at distance r1 and the rotor plane, denoted by $a_{0,r1}$. The method according to the invention indeed allows determination of the induction factor between the measurement plane and the rotor plane. It is noted that this induction factor is close to 1 and that it is variable over time.

FIG. 6 is a curve of induction factor a as a function of time T. FIG. 6 illustrates the induction factor between the measurement plane at distance r1 and the rotor plane denoted by $a_{0,r1}$, the induction factor between the measurement plane at distance r2 and the rotor plane denoted by $a_{0,r2}$, and the induction factor between the measurement plane at distance r3 and the rotor plane denoted by $a_{0,r3}$. The method according to the invention indeed determines the induction factor between the measurement plane and the rotor plane. It is noted that the three induction factors are variable over time and that the closer the measurement plane is to the rotor plane, the closer the induction factor is to 1, which corresponds to the wind induction phenomenon. Determining several induction factors between different measurement planes and the rotor plane allows determination at any time the induction factor variation as a function of the distance to the rotor plane.

The invention claimed is:

1. A method of control of a wind turbine using determination of an induction factor in a wind field between at least one measurement plane upstream from a rotor plane of the wind turbine and the rotor plane, the wind turbine including a LiDAR, the induction factor in the wind field representing a wind speed deceleration coefficient between at least two spaced apart locations in the wind field respectively located between at at least one measurement plane upstream from the wind turbine and at the rotor plane, with deceleration of the wind speed resulting from operation of the wind turbine in the wind field, comprising:
- a) measuring the wind speed in the rotor plane and in the at least one measurement plane spaced upstream from the rotor plane by using the LiDAR sensor;
- b) determining the wind speed in the rotor plane by using the measurements of the wind speed in the rotor plane and in at least one measurement plane upstream from the rotor plane and a Kalman filter;
- c) determining the induction factor of the wind between at least one of the measurement planes and the rotor plane by using the wind speed measured in the rotor plane, the wind speed measurement in the at least one measurement plane upstream of the rotor plane and an adaptive Kalman filter; and
- d) controlling the wind turbine as a function of the determined induction factor.

2. A method of control of a wind turbine as claimed in claim 1, wherein the wind speed in the rotor is determined by use of a Kalman filter applied to a parametric function relating the wind speed to a distance between the rotor plane and the at least one measurement plane.

3. A method of control of a wind turbine as claimed in claim 2, wherein the parametric function is a degree 2 polynomial function or a piecewise affine function.

4. A method of control of a wind turbine as claimed in claim 2, wherein a state model used in the Kalman filter is written as:

$$\begin{cases} x(k) = x(k-1) + \mu(k) \\ y(k) = Hx(k) + \epsilon(k) \end{cases},$$

with k being discrete time, x being vector comprising coefficients of the parametric function, y being a wind speed vector in the rotor plane and at least one of the measurement planes and H being a matrix depending on distance of the at least two measurement planes from the rotor plane and defined according to the parametric function μ being a variation of the coefficients of the parametric function and ε being a measurement noise vector.

5. A method of control of a wind turbine as claimed in claim 4, wherein the parametric function is a polynomial function written as: $f(r_i)=c_2 r_i^2+c_1 r_0+c_0$, with ri being a distance of measurement plane i, f being the parametric function, c0, c1, c2 being coefficients of the parametric function, and wherein a matrix H written as:

$$H = \begin{bmatrix} r_1^2 & r_1 & 1 \\ \ldots & \ldots & \ldots \\ r_n^2 & r_n & 1 \end{bmatrix},$$

with n being a number of measurement planes for which measurements have been performed.

6. A method of control of a wind turbine as claimed in claim 1, wherein the induction factor is determined by applying the adaptive Kalman filter to a state model written as:

$$\begin{cases} a_{r_i,r_j}(k) = a_{r_i,r_j}(k-1) + \xi(k-1) \\ u_{r_i}(k) = u_{r_j}(k) a_{r_i,r_j}(k) + v(k) \end{cases}, \text{ with}$$

$$v(k) = -\epsilon_{r_i}(k) + \epsilon_{r_j}(k) a_{r_i,r_j}(k),$$

and k being a discrete time, ri being a distance from the rotor plane to the rotor plane measurement plane from i, rj being a distance from the rotor plane to the measurement plane j, ari being the induction factor between the measurement plane i and the measurement plane j, uri being wind speed in plane i, urj being the wind speed in plane j, ξ being induction factor variation over time, εri being noise of the wind speed in the measurement plane i uri, and εrj being noise of the wind speed in the measurement plane j urj.

7. A method of at least one of diagnosis and monitoring of a wind turbine equipped with a LiDAR sensor which is controlled by using of determination of an induction factor, comprising:
- a) determining the induction factor of the wind between a measurement plane and the rotor plane of a wind turbine by use of the method as claimed in claim 1;
- b) determining aerodynamic power drawn from the wind by the wind turbine by using the induction factor of the wind determined between the at least one measurement plane and the rotor plane; and
- c) performing at least one diagnosing and monitoring operation of the wind turbine by use of the determined aerodynamic power.

8. A computer program product, comprising code instructions for executing the steps of a method as claimed in claim 1, when the program is executed on a processor of the LiDAR sensor.

9. A LiDAR sensor for a wind turbine, comprising a processor for implementing a method as claimed in claim 1.

10. A wind turbine comprising a LiDAR sensor as claimed in claim 9, wherein the LiDAR sensor is positioned on a nacelle of the wind turbine or in a hub of the wind turbine.

* * * * *